Sept. 23, 1924.
C. L. McKESSON
1,509,369
GARDEN RAKE ATTACHMENT
Filed July 24, 1923
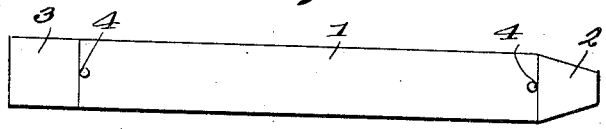
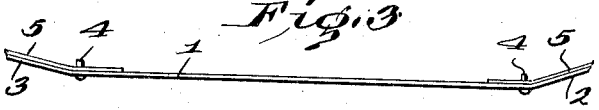
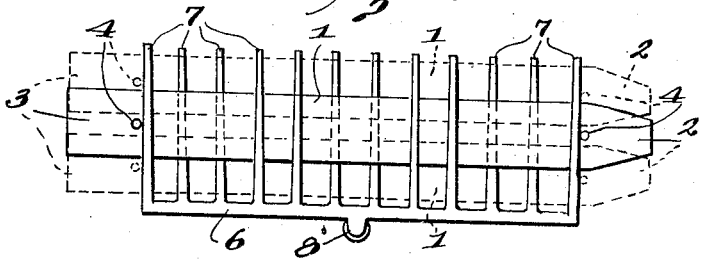
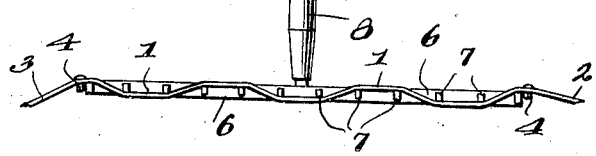
Inventor
Charles L. McKesson
By
Attorney Patented Sept. 23, 1924.

1,509,369

UNITED STATES PATENT OFFICE.

CHARLES L. McKESSON, OF LOS ANGELES, CALIFORNIA.

GARDEN-RAKE ATTACHMENT.

Application filed July 24, 1923. Serial No. 653,547.

*To all whom it may concern:*

Be it known that I, CHARLES L. MCKESSON, a citizen of the United States, and a resident of the city of Los Angeles and county of Los Angeles and State of California, have invented a new and useful Improvement in Garden-Rake Attachments, of which the following is a specification.

My invention relates to attachments for garden rakes by which they can be used to perform their usual or ordinary work and purposes, but can be used efficiently for the following purposes in addition to those for which the ordinary garden rake can be used successfully;

To remove leaves, pebbles and small particles from smooth and uneven surfaces. Such work cannot be efficiently accomplished by the ordinary rake because such articles pass between the rake teeth;

To easily gather and remove pebbles and fine particles from long and short grass which it is very difficult to do with the ordinary rake;

In gardening and similar work to stir, level and remove small pebbles and clods from the ground at one and the same operation;

To dig weeds and dandelions out of the lawn without injury to the grass;

To trim the grass along sidewalks, around posts and in ditches left by the lawn mower;

To make small furrows for seeding purposes, and to cover the seeds a uniform depth as deep as desired;

To dig and loosen the ground around flowers and plants;

To do everything that can be done with a small sharp hoe, a narrow sharp-pointed tool, and a rake having an adjustable device which prevents leaves, pebbles and small particles from passing between its teeth. This device can be easily, and quickly raised or lowered as needed by simply striking the rake on the ground or walk.

My invention is simple, durable and inexpensive to manufacture, and is easily secured to or removed from a rake and is adapted to be used on all kinds and sizes of garden rakes. It is in one piece and there are no nuts or bolts to be fastened, and no loose parts of any kind.

Having shown the purpose and design of my invention, I shall now illustrate and describe it. In the accompanying drawings, similar characters refer to similar parts in all figures.

Fig. 1 is a side view of my invention in which 1 is a thin strip of flexible material, preferably spring steel, having its ends 2 and 3 sharpened for cutting and digging purposes. The end 2 is slightly pointed while end 3 is the full width of the strip, and it may be widened if desired. Near each point, the rivets 4, 4, are secured and are adapted to rest against the outside of the first and last tooth of the rake to prevent the strip from moving longitudinally when the points strike hard substances when these ponts are used for cutting, digging and hoeing. Fig. 2 is a sectional edge view of the strip 1 and shows the ends 2 and 3 slightly curved for convenience in use. The curving of the ends is not an essential element of my invention but it is of advantage.

Fig. 3 is the same as Fig. 2 with the addition of reinforcing means 5, 5, extending some distance back from the points 2 and 3. The purpose of the reinforcement of the respective ends is to strengthen them when required for cutting, digging and hoeing extremely hard and tough substances. This reinforcement may be accomplished in manufacturing by thickening the strip at and near its ends, or by riveting or welding an extra piece on the strip.

Fig. 4 shows the strip 1 inserted in the teeth of a rake ready for use. The dotted lines show the strip at various positions in the rake teeth. The strip can be adjusted by simply striking the rake on the ground or walk, so that the rake teeth will extend below it any distance desired for doing different kinds of work.

Fig. 5 is a plan of the rake showing the edge of the strip and the manner in which it is inserted in the teeth of a rake. It is of the utmost importance that each of the ends 2 and 3 rest against the respective end teeth on the side toward the rake handle. When placed in this position the ends 2 and 3 are supported by the rake teeth which hold the ends stiff and firm when cutting, digging and hoeing, whereas if they were placed against the opposite side of these respective teeth these ends would spring and be inefficient.

In practice it has been found that the most satisfactory results are secured when the strip is inserted in the rake teeth by passing it first back and then in front of every alternate two teeth. This method can be employed in securing the strip in most rakes, but not in all. When the number of rake teeth divided by two gives an even number as a quotient, the method described can be employed, but if the number of such teeth so divided by two gives an odd quotient, the strip must be inserted back and in front of three teeth twice and then between every alternate two teeth, in order to have its ends 2 and 3 properly supported by the rake teeth.

The strip can be easily and quickly inserted in the teeth of a rake by weaving it in and out in front and behind the rake teeth which hold it firmly and securely from moving longitudinally when cutting, digging and hoeing, and permit it to be moved easily close to or away from the points of such teeth as desired for work of different kinds.

The manner of inserting the strip in the rake teeth may be varied as required to properly secure and hold it in place. For instance a very thin, springy strip with reinforced ends may be inserted in front and behind each alternate rake tooth. In practice the strip is inserted in the rake teeth as herein described, so that the ends 2 and 3 project beyond the sides of the rake. It is evident the strips would have to be of lengths adapted for use in standard rakes of various widths. The rake with my device on it is now ready for use for many novel and useful purposes. For instance, where it is desired to gather and remove leaves, pebbles and small particles from cement walks and smooth ground the rake teeth are struck on the ground or walk until the strip is even with the points of the rake teeth and touch the ground when raking. The rake will now collect and remove very small particles of every kind, from level surfaces. In lawns where the grass runs along the surface of the ground so as to catch and hold the teeth of the rake extending down into them it is exceedingly difficult to collect and remove small substances with the ordinary rake, whereas a rake with my attachment can be used successfully by adjusting the strip so that the rake teeth will project only slightly into the grass. In gardening where it is desired to stir the ground, smooth it and remove pebbles and clods, the strip is adjusted so the rake teeth will extend below it as far as it is desired to loosen the ground and rake teeth are sunk into the ground until the strip comes in contact with it. The strip serves to smooth the surface of the ground and to collect and remove all undesirable substances from it.

It is apparent that this adjustable strip which prevents all particles from passing between the rake teeth, can be made to serve many convenient and useful purposes in raking.

But my invention not only makes the rake more efficient for raking purposes, but it adds useful, new and novel features. The sharp ends 2 and 3 enable it to be used as a sharp knife for a great variety of cutting purposes, and to be used for every purpose for which a sharp pointed tool, and a small sharp hoe can be employed. These ends are easily kept sharpened because of being small and thin. They can be kept sharp with a small file or by rubbing them on a cement sidewalk, brick or other similar substance. Many features of my invention are of great convenience and service when working in the yard and garden.

The form of construction of my device may be varied as may be found of advantage in manufacture and use.

Having described my invention what I claim as new and desire to secure by Letters Patent are:

1. A rake attachment comprising a strip of spring material arranged to be inserted between the teeth of a rake and by frictional contact with the teeth and by its own spring action on said teeth to hold itself in adjusted position.

2. In combination with a rake, a strip of spring material arranged between and engaging opposite sides of certain of the teeth and active to hold itself in adjusted position, the length of said strip exceeding that of the rack so that the ends of the strip project beyond the ends of the rack and the ends of said strip being sharpened.

3. In combination with a rake, a strip of spring material arranged between the teeth of the rake, engaging opposite sides of certain of the teeth active to hold itself in adjusted position, longitudinally of the rake teeth and provided with means to prevent longitudinal movement of said strip.

In testimony whereof I hereunto affix my signature.

CHARLES L. McKESSON.